Figure 1:
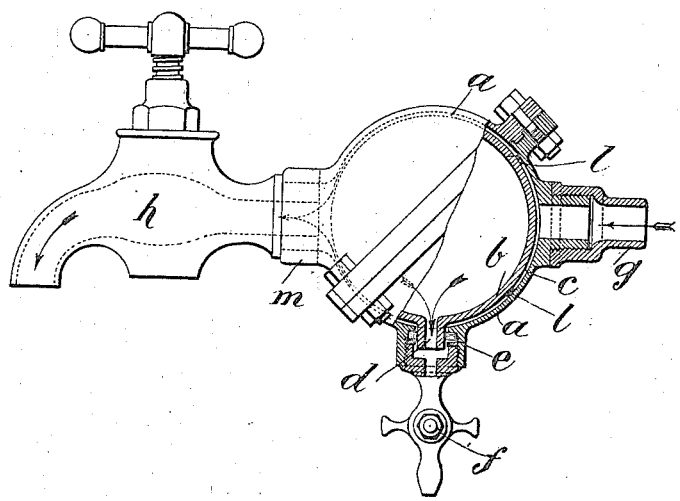

No. 680,681. Patented Aug. 20, 1901.
A. F. AVÉZARD, Jr. & J. E. CLERC.
FILTER FOR PURIFYING WATER.
(Application filed Sept. 25, 1900.)

(No Model.)

Witnesses:
E. Holloway
W. C. Pinckney

Inventors:
August François Avézard, Jr.
Jules Emmanuel Clerc
By Edmond Congar Brown
Attorney

United States Patent Office.

AUGUSTE FRANÇOIS AVÉZARD, JR., AND JULES EMMANUEL CLERC, OF PARIS, FRANCE.

FILTER FOR PURIFYING WATER.

SPECIFICATION forming part of Letters Patent No. 680,681, dated August 20, 1901.

Application filed September 25, 1900. Serial No. 31,043. (No model.)

*To all whom it may concern:*

Be it known that we, AUGUSTE FRANÇOIS AVÉZARD, Jr., and JULES EMMANUEL CLERC, citizens of the French Republic, residing in Paris, France, have invented a certain new and useful Double-Acting Filter Permitting the Drawing from the Same Source Purified Water and Water in its Natural State, of which the following is a specification.
Our invention relates to improvements in filters for purifying water, and its special object is to provide a double-acting filter which, combined with two cocks, permits the drawing from the same source of purified water and water in its natural state. We attain this object by the apparatus illustrated in the accompanying drawings, in which—

Figure 2:
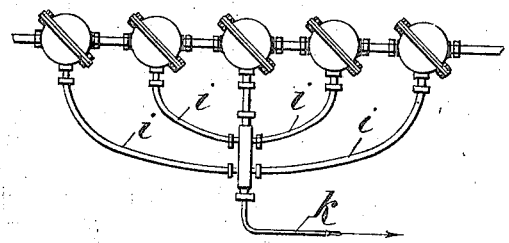

Figure 1 is a side view of the apparatus, partly in section; and Fig. 2 represents part of a filter in series for purifying water in large quantities.

The construction of the apparatus is as follows: In a hollow metallic receptacle of spherical form $a$ we place another hollow and spheric vessel $b$, made of china or any other filtering and sterilizing material, in such a way that only a small everywhere-equal space is left between the two vessels $a$ and $b$. This space is designated on the drawings by the letter $c$.
The interior of the hollow vessel $b$ is in communication, by means of the mouthpiece $d$, with a cock $f$. The mouthpiece $d$ serves to keep the vessel $b$ in position. It rests in a bedding formed by the rubber ring $e$ and the piece bearing the cock $f$. In order that the space $c$ be everywhere equal, little rubber plates are arranged between the filter $b$ and the hollow vessel $a$. This arrangement has also the effect that the filter $b$ cannot be pressed against the mouthpiece $m$ by the pressure of the water whereby the outlet toward $m$ would be closed and the mouthpiece $d$ could be broken. It has, furthermore, the purpose to avoid the breaking of the mouthpiece $d$ through the shocks produced in the apparatus and its feed-pipe when the cock $h$ is opened or closed.

Now we shall describe the working of the apparatus. As soon as the cock $h$ is opened the water flows from the outside to the inside; but the apparatus may be arranged in a way that the operation takes place in the opposite direction. The washing of the filter by the water running out through the cock $h$ will be nearly a continuous one, as this cock will be very frequently opened for the daily wants of the household. It follows that there will be no occasion for the deposit on the exterior surface of the filter to accumulate to any extent. Should any deposit accumulate on account of the cock $h$ having remained closed for a certain time, the deposit is localized on the surface of the filtering vessel and will be carried off by the force of the current as soon as the cock $h$ is opened, the more so as when the cock $f$ remains closed and the filter $b$ being full of water there is no passage for the liquid through the filtering-wall of the vessel, nor is there any pressure from the outside to feed-pipe through the mouthpiece $g$ into the space $c$, the section of which is very small in order to increase the speed of the water, so that the exterior surface of the filtering and sterilizing vessel $b$ is thoroughly washed and swept by the passing water and the deposit left by the filtering of the water on the surface of the vessel $b$ swept off and carried away by the same through the cock $h$. The cock $f$ is for the purified water. When this cock is opened and the cock $h$ closed, the water is pressed through the wall of the vessel $b$ into the interior of the same, whereby it is filtered and sterilized and then runs out through the cock $f$. In this way the filter furnishes drinking-water through the cock $f$ and water for washing and similar purposes through the cock $h$.

As shown by the foregoing description, the filtering takes place by passing the water through the wall of the vessel $b$ to the inside of the filter.

The hollow body $a$ is made in sections, so that it may be easily taken apart should it be necessary to replace the filtering vessel. The latter may also be composed of two or more pieces.

The spherical form of the filter plays only a secondary part in the working of the apparatus; but it will be well to use this form, because it offers to the pressure a relatively large resistance.

When large quantities of filtered water are required, the filter may be arranged in series or batteries, as shown in Fig. 2. In such a case the cocks $h$ would be dispensed with and replaced by a system of pipes $i$, Fig. 2, collecting the water which is not filtered in the outlet-pipe $k$.

What we claim as our invention, and desire to secure by Letters Patent, is—

1. A cock-filter comprising a very thin-walled spherical filtering-body $b$ located in a metallic spherical shell $a$ with a narrow passage between the two, said shell carrying horizontally and diametrically opposed mouthpieces for entrance and discharge of non-filtered water, substantially as described above.

2. A cock-filter comprising a very thin-walled spherical filtering-body $b$ in communication with the exterior air by means of a mouthpiece $d$ made integrally with it and disposed vertically on its lower side and arranged to be closed by means of a cock, substantially as described.

3. A cock-filter comprising a very thin-walled spherical filtering-body $b$ in communication with the exterior air by means of a vertically-located mouthpiece $d$ contained within a spherical metallic shell $a$ with a small space between the two, said shell carrying two horizontal and diametrically opposed mouthpieces for admission and discharge of non-filtered water, the metallic spherical shell $a$ being in sections of which the junction is oblique in reference to the three mouthpieces for admission and discharge of non-filtered water and for discharge of filtered water, substantially as described above.

4. A cock-filter comprising a thin-walled spherical filtering-body $b$ in communication with the exterior air by means of a vertically-located mouthpiece $d$, a metallic shell $a$ in sections joined obliquely in reference to the mouthpieces for admission and discharge of water, a cock $f$ for discharge of filtered water, and a pack-ring $e$, substantially as described above.

Signed at Paris, France, this 13th day of September, 1900.

AUGUSTE FRANÇOIS AVÉZARD, JR.
JULES EMMANUEL CLERC.

Witnesses:
PAUL BACARD,
CHARLES MEMGELLE.